(12) United States Patent
Galvanauskas

(10) Patent No.: US 7,424,193 B2
(45) Date of Patent: Sep. 9, 2008

(54) COMPOSITE WAVEGUIDE

(75) Inventor: Almantas Galvanauskas, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 11/180,224

(22) Filed: Jul. 13, 2005

(65) Prior Publication Data

US 2006/0024008 A1 Feb. 2, 2006

Related U.S. Application Data

(60) Provisional application No. 60/587,988, filed on Jul. 14, 2004.

(51) Int. Cl.
*G02B 6/00* (2006.01)

(52) U.S. Cl. .................. 385/123; 385/28; 385/29

(58) Field of Classification Search ............... None
See application file for complete search history.

(56) References Cited

U.S. PATENT DOCUMENTS

| | | | | |
|---|---|---|---|---|
| 4,049,413 A | * | 9/1977 | French | .......... 65/392 |
| 4,204,851 A | * | 5/1980 | Nolan | .......... 65/421 |
| 4,315,666 A | | 2/1982 | Hicks | |
| 4,372,645 A | * | 2/1983 | Miller | .......... 385/28 |
| 4,676,594 A | * | 6/1987 | Presby | .......... 385/123 |
| 4,962,994 A | * | 10/1990 | Someda | .......... 385/126 |
| 5,452,394 A | | 9/1995 | Huang | |
| 6,496,301 B1 | | 12/2002 | Koplow et al. | |
| 6,839,486 B2 | | 1/2005 | Kopp et al. | |
| 2002/0146226 A1 | * | 10/2002 | Davis et al. | .......... 385/126 |
| 2004/0223715 A1 | * | 11/2004 | Benoit et al. | .......... 385/123 |

FOREIGN PATENT DOCUMENTS

| | | | |
|---|---|---|---|
| EP | 0274878 A1 | * | 7/1988 |
| GB | 2143394 A | | 2/1985 |
| JP | 59-121301 | | 7/1984 |
| JP | 59-121301 A | * | 7/1984 |

OTHER PUBLICATIONS

Definition of "helix" from Oxford English Dictionary Online, retrieved Aug. 31, 2007, via http://dictionary.oed.com/cgi/entry/50104458?single=1&query_type=word&queryword=helix&first=1&max_to_show=10.*
International Preliminary Report on Patentability for PCT/US05/025075, issued Jan. 16, 2007.*
International Search Report dated Jan. 26, 2006 for PCT/US2005/025075.
Kopp et al., Chiral Fiber Gratings, Science Maganzine, vol. 305, pp. 74-75, Jul. 2, 2004.
Kopp et al., "Double-helix chiral fibers", Optics Letters, vol. 28, No. 20, p. 1876-1878, Oct. 15, 2003.

* cited by examiner

*Primary Examiner*—Sung Pak
*Assistant Examiner*—Mike Stahl
(74) *Attorney, Agent, or Firm*—Rader, Fishman & Grauer PLLC

(57) ABSTRACT

A composite waveguide comprising a central core and at least one side core helically wound about said central core and in optical proximity to said central core.

11 Claims, 10 Drawing Sheets

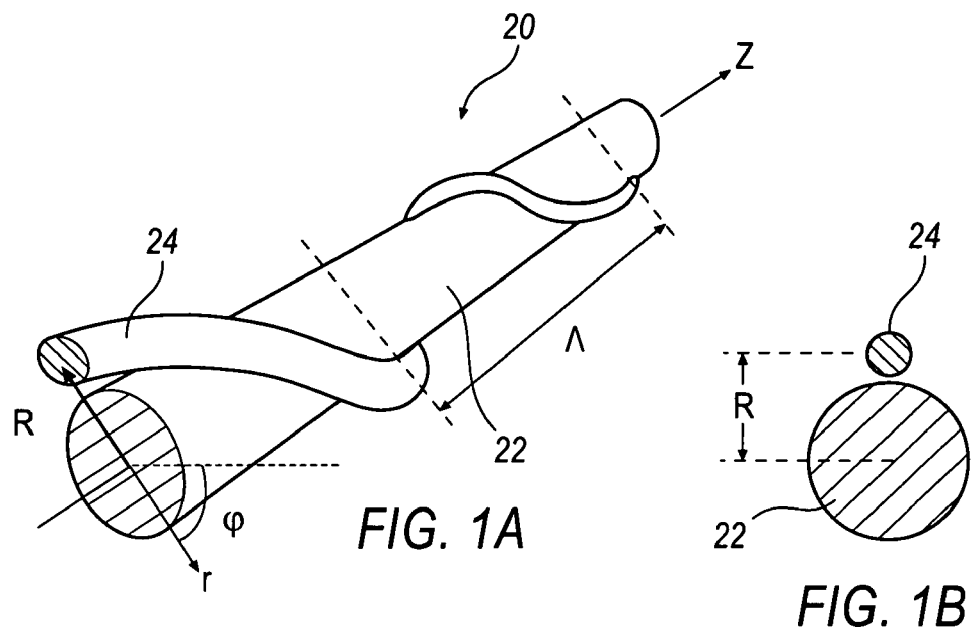
*FIG. 1A*
*FIG. 1B*
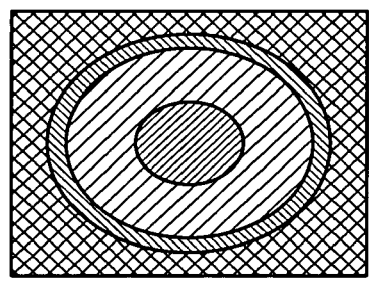 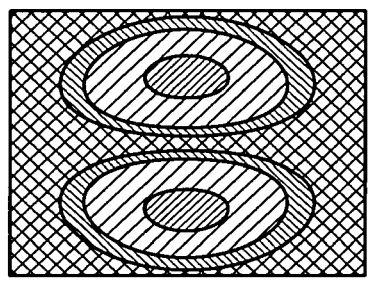
LP$_{01}$ - radial and azimuth symmetric
LP$_{11}$ - radial and azimuth anti-symmetric
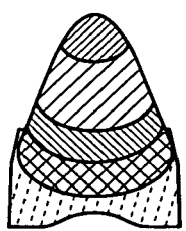 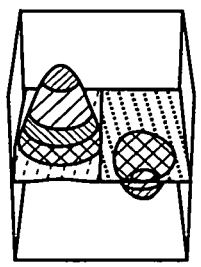
*FIG. 2*

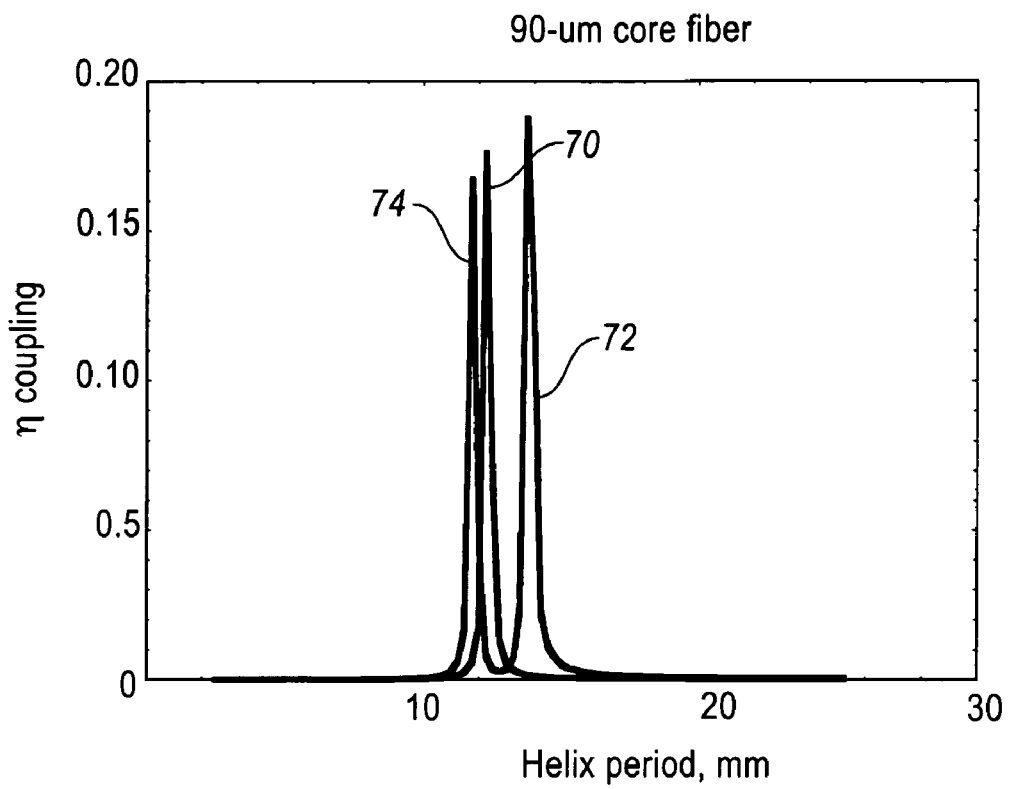
FIG. 10C
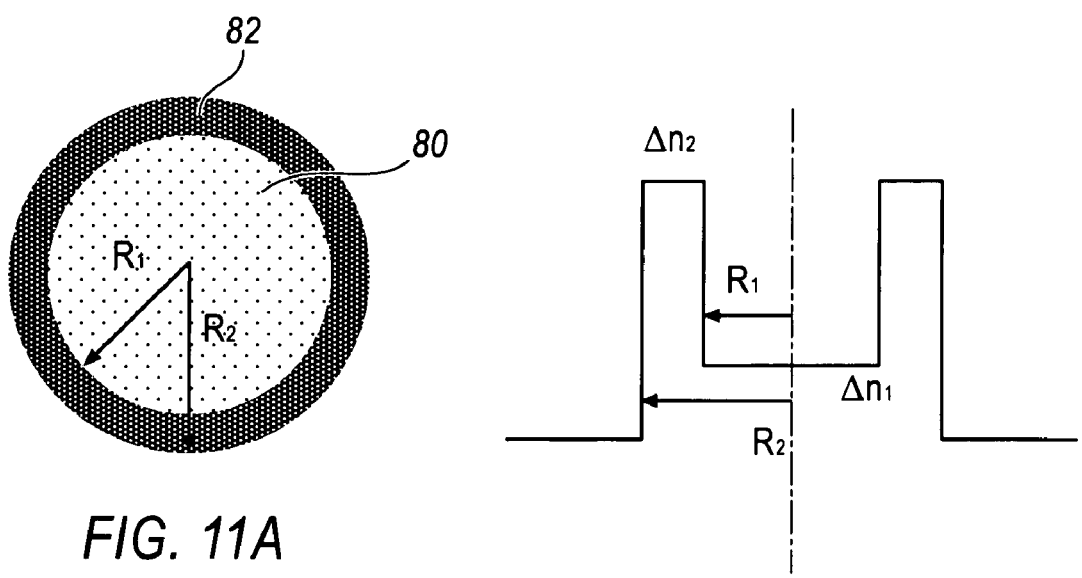
FIG. 11A
FIG. 11B

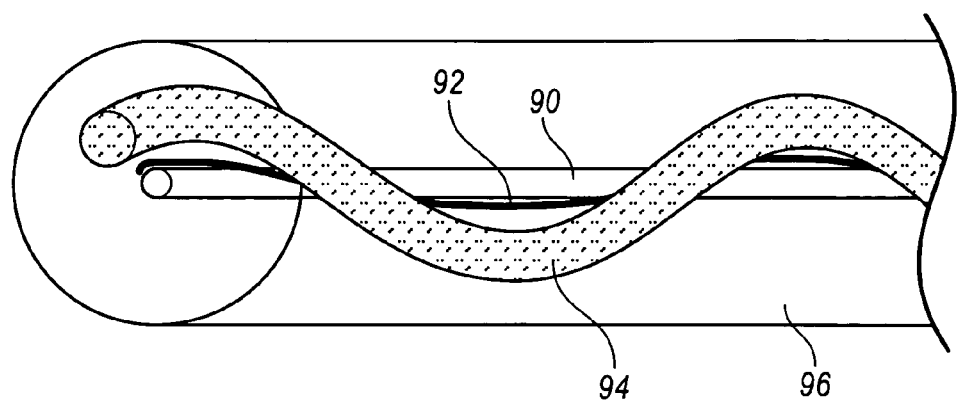
FIG. 12
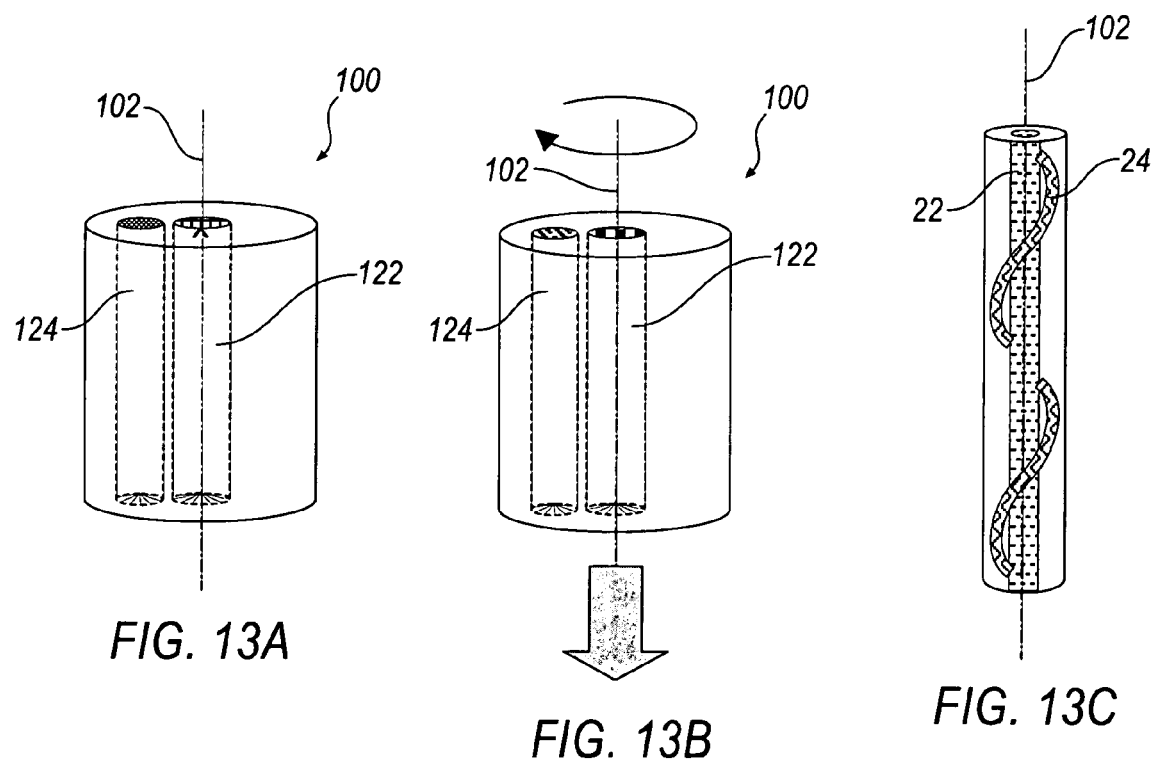
FIG. 13A
FIG. 13B
FIG. 13C

COMPOSITE WAVEGUIDE

CROSS-REFERENCE TO RELATED APPLICATION

This application claims the benefit of U.S. Provisional Application Ser. No. 60/587,988 filed Jul. 14, 2004, which is hereby incorporated by reference in its entirety.

TECHNICAL FIELD

The embodiments of the invention described herein are generally directed to optical waveguides, and more particularly to optical fibers.

BACKGROUND

Fiber laser systems have rapidly increased in power output due to progress in high-brightness semiconductor diode pumps and the emergence of large-mode area fibers. Large-mode area fibers facilitate the achievement of high powers by reducing the detrimental effects of non-linear interactions in a fiber core, by reducing fiber susceptibility to optical damage, and by allowing larger cladding sizes of double-clad fibers.

As a result, fiber lasers have become the most powerful solid-state laser technology to date, capable of providing diffraction-limited powers nearly two orders of magnitude larger are available from the conventional solid-state lasers. The rise of fiber laser technology is even more significant due to the practical nature of fiber lasers. Indeed, fiber lasers offer a technological platform for monolithic, compact and very efficient lasers, which may be produced in a fashion similar to building electronic instruments, and very different from complex and skill-demanding assembly processes typically required for conventional open-cavity lasers. Therefore, there exists the potential of replacing the majority of currently used conventional solid-state lasers with much more compact, reliable, efficient and cost effective fiber lasers, thus significantly advancing the majority of laser applications.

Currently there are three techniques that enable use of large-mode-area (LMA) fibers: (i) single-mode excitation of a multimode core, (ii) distributed mode filtering in a properly coiled fiber and (iii) photonic-crystal large-mode fibers. All three techniques have approximately similar limits for the maximum allowable mode size, despite the fact that techniques (i) and (ii) both use multimode-core fibers while (iii) is distinctly different in that it uses a single-mode core fiber.

However, the current methods of mode-size scaling are very limited in many important practical aspects. First, mode size is limited, thus restricting further power and energy scaling. Second, use of large-core fibers is practically limited by their multimode nature. Third, direct fiber splicing is not achievable and conventional fused single-mode devices are not possible. Thus, further practical advances of fiber laser technology are hindered because fiber laser fabrication is significantly more complicated when compared to single-mode telecom-style devices.

Accordingly, there is a need for a fiber design that significantly increases the mode sizes and provides large-mode fibers with an effectively single-mode core. Preferably, such a fiber design would also permit the use of standard single-mode fiber splicing techniques. Additionally, such a fiber design would preferably be applicable to index-guiding fibers and photonic-crystal fibers. Further, the fiber design preferably would not be sensitive to bending effects for large-mode field diameters. This would enable the modal properties of the fiber to be determined by the structure rather than by the coiling. Finally, such a fiber design preferably would not require complicated mode filtering and excitation techniques so that the fiber might be used for both passive fibers and amplifying fibers.

SUMMARY

A composite waveguide is disclosed. The composite waveguide has a central core and at least one side core helically wound about the central core and in optical proximity to the central core. The central core may be configured for large mode areas and the composite waveguide may be configured as an index-guiding fiber or a photonic crystal fiber. In alternative embodiments, the central core may be configured to guide a primary mode. The central core may also be straight. The side core may be configured to provide efficient and selective coupling between the side core and modes in the central core. The coupling between the side core and the central core may be configured such that substantially only predetermined higher-order modes of the central core are coupled to the side core. The side core may further be configured to provide high loss for modes propagating along the side core. The mode fields of the central core and the side core may be at least partially overlapping.

Alternately, the composite waveguide may comprise a central core, at least one side core helically wound about the central core and in optical proximity to the central core, and at least one stress filament helically wound about the central core and applying stress on the central core in an azimuthally varying direction along the length of the central core.

In another embodiment, the composite waveguide may comprise a central core, at least one side core helically wound about the central core, a first edge of the side core being in optical communication with the central core, and an exterior portion of the side core being substantially near the outer radius of the composite waveguide. The exterior portion includes at least one structural defect, which facilitates modal loss from the composite waveguide. The structural defect may be configured using capillary stacking, dopants, or absorption of dopants.

Further, a composite waveguide may comprise a means for guiding a primary mode and a means for guiding higher order modes helically disposed about the means for guiding a primary mode. The means for guiding higher-order modes may further comprise a means for increasing losses of the higher modes.

A method of manufacturing a composite waveguide may comprise drawing a fiber preform having a central core and at least one off-center side core and rotating the preform as the composite waveguide is being drawn. The central core may be configured for large mode areas and a fiber-drawn oven may be rotated to rotate the preform. Alternatively, the composite waveguide may be configured as an index-guiding fiber or a photonic crystal fiber. The speed of the rotation may be substantially constant. The helical period of the off-center core may be determined by the rotating speed and/or fiber draw velocity. The direction of the rotation may be reversed periodically. The speed of the rotation may be varied to provide variable helical periods of the off-center core.

BRIEF DESCRIPTION OF THE DRAWINGS

The features and inventive aspects of the present invention will become more apparent upon reading the following detailed description and claims in conjunction with the drawings, of which the following is a brief description:

FIG. 1A is a perspective view of a composite waveguide according to a first embodiment;

FIG. 1B is a cross-sectional view of the composite waveguide of FIG. 1;

FIG. 2 is a cross-sectional and three-dimensional profile of fundamental mode ($LP_{01}$) and higher-order ($LP_{11}$) mode of the composite waveguide of FIG. 1;

FIGS. 10A-10C illustrate mode coupling between the side core and central core modes $LP_{01}$ and $LP_{11}$ for the composite waveguide of FIG. 1 with an increasing central core size;

FIG. 11A is a cross sectional view of a ring-type fiber core profile for use with the composite waveguide of FIG. 1;

FIG. 11B is an index profile for the ring-type fiber core of FIG. 11A;

FIG. 12 illustrates a stress filament applying stress to the composite waveguide of FIG. 1 in an azimuthally varying direction along the fiber length; and FIGS. 13A-13C illustrate an embodiment for a method of manufacturing the composite waveguide of FIG. 1.

DESCRIPTION

Figure 3A:
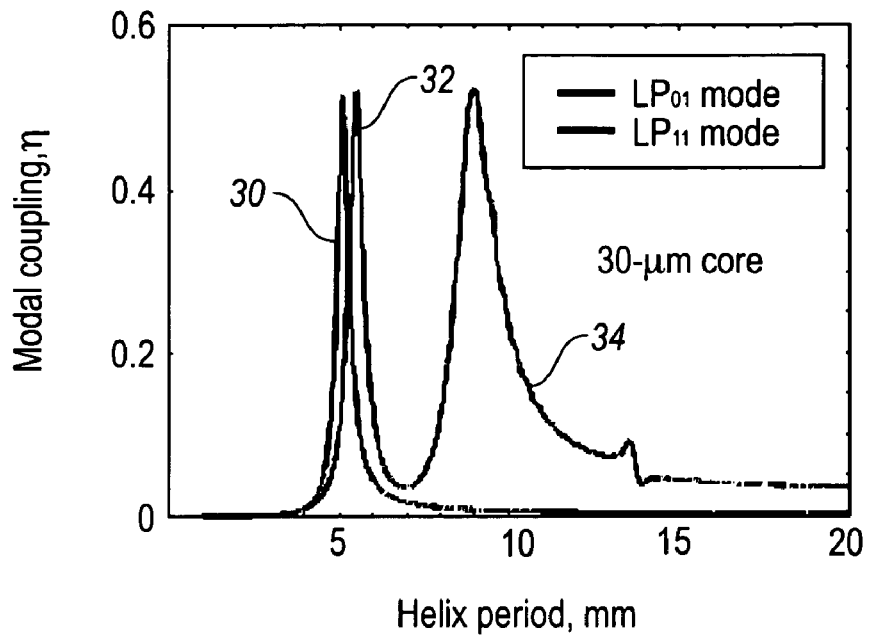
FIG. 3A is a graph showing the difference between exactly phase-matched and quasi-phase-matched mode coupling for a 30 μm size central core of the composite waveguide of FIG. 1.

Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limit or restrict the invention to the precise form and configuration shown in the drawings and disclosed in the following detailed description.

Referring now to FIG. 1, a Helix-Coupled-Core (HCC) fiber 20 is shown. HCC fiber 20 includes a large-mode-area central core 22, and a helical side core 24. Central core 22 is generally straight and helical side core 24 is helically coiled around the circumference of HCC fiber 20. Central core 22 guides modes propagating along the z-direction, while helical side core 24 supports modes that are propagating in a helical path around central core 22. Because helical side core 24 is in optical proximity to central core 22, the HCC fiber 20 is a compound waveguide. The optical fields of the neighboring cores 22, 24 partially overlap, and therefore, interact.

By design, all higher-order modes of central core 22 have large loss, while the fundamental mode of central core 22 has negligible loss. The composite structure of central core 22 and helical side core 24 provides efficient and highly selective coupling between higher-order modes in the central core 22 and helical side core 24. Further, the composite structure provides high loss for modes propagating in helical side core 24 and imparts high loss onto the coupled higher-order modes of central core 22. Thus, central core 22 of HCC fiber 20 is effectively single-mode.

The optical proximity of central core 22 and helical side core 24 is determined so that the mode fields of neighboring cores 22, 24 overlap. To provide optical proximity, neighboring cores 22, 24 are separated by a distance "D" that is comparable to the length-scale of the optical wavelength at which modal fields in the neighboring cores 22, 24 have significant mode field overlap. Central core 22 and helical side core 24 are coupled by way of modal symmetry. That is to say, neighboring cores 22, 24 may be configured to be coupled by the difference between azimuth-profiles and radial-profiles of the different modes.

The configuration and coupling of central core 22 and helical side core 24 or HCC fiber 20 is explained in detail below with respect to FIGS. 1-9. Conventionally, power coupling between two modes of two straight waveguides occurs only when the phase velocities (or, equivalently, propagation constants $\beta^{(1)}$ and $\beta^{(2)}$) of the modes become equal (exact phase-matching between the modes). When helical side core 24 is helically coiled around central core 22, the phase-matching condition becomes modified due to the helicity of the side-core mode path, which effectively "slows" the side mode propagation along the fiber axis z. In this case, the phase-matching condition for mode-coupling becomes $\beta^{(1)} + \Delta\beta_{Helix\_corr.} = \beta^{(2)}$, where $\beta^{(1)}$ and $\beta^{(2)}$ are respectively helix- and central-core mode propagation constants and the helicity-correction is described by: $\Delta\beta_{Helix\_corr.} = \beta^{(1)} (\sqrt{(2\pi R/\Lambda)^2+1}-1)$. Where R is the helix radius and $\Lambda$ is the helix period.

To reveal additional phase-matching mechanism one needs to consider azimuth structure of the central-core modes. In a cylindrical coordinate system (r,φ,z) associated with HCC fiber 20 according to FIG. 1, the modes of central core 22 can be described as a product of radius-only and azimuth-only varying components: $E(r,\phi)=E(r)\sin(l\phi)$. Here integer l represents an azimuth order of each particular mode. This is illustrated by 2D and 3D profiles of a fundamental ($LP_{01}$) and higher-order ($LP_{11}$) modes shown in FIG. 2. Because azimuth position of the helix side rotates around fiber axis z along HCC fiber 20 with a period $\Lambda$, for central core 22 modes with l>0 there will be an additional phase difference $2\pi l$ acquired after each $\Lambda$ between the central core 22 and helical side core 24 modes propagating along the z-axis. Due to this there will be an additional term in the helicity correction factor:

$$\Delta\beta_{Helix\_corr.} = \beta^{(1)}\sqrt{(2\pi R/\Lambda)^2+1}-1)\pm 2\pi l/\Lambda.$$

This term may be described as quasi-phase matching (QPM) between the modes of central core 22 and helical side core 24. Because the fundamental central core 22 mode l=0, there is no azimuth or radial phase dependence and the quasi-phase matching is absent. Even if propagation constants of, for example, fundamental $LP_{01}$ and next $LP_{11}$ central core 22 modes are arbitrarily close (that happens at very large core sizes) proper use of quasi-phase matching may provide that only $LP_{11}$ will be strongly interacting with the helically propagating modes and, thus, only $LP_{11}$ becomes lossy. Note that selection by the radial symmetry difference (radial phase dependence) can also occur in HCC fiber 20, permitting suppression of high-order modes with l=0.

The difference between exactly phase-matched and quasi-phase-matched mode coupling is revealed in FIG. 3A, illustrating coupled-mode theory results for modal coupling from $LP_{01}$ and $LP_{11}$ modes of central core 22 into single-mode helical side core 24 are shown as a function of helix period. HCC fiber 20 structure consists of 30 μm and 0.06 numerical aperture (NA) central core 22 and a single 8 μm and 0.07 NA helical side core 24 that is separated by 4 μm (edge-to-edge) from central core 22.

Figure 3B:
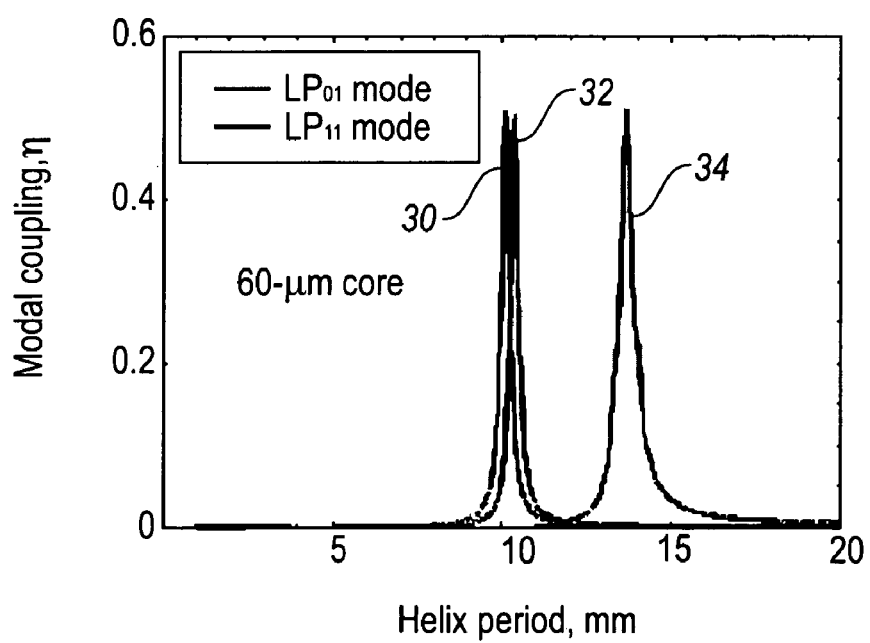
FIG. 3B is a graph showing the difference between exactly phase-matched and quasi-phase-matched mode coupling for a 60 μm size central core of the composite waveguide of FIG. 1.

As illustrated, fifty percent coupling provides that on average half of the total power is in each of cores 22, 24. The qualitative difference between phase-matched $LP_{01}$ 30 and quasi-phase-matched $LP_{11}$ modes 32, 34 is that $LP_{01}$ coupling exhibits a single narrow peak, while $LP_{11}$ coupling exhibits two peaks; the second peak being much broader and far apart from the $LP_{01}$ mode peak. FIG. 3B illustrates the coupling for a 60 μm size central core 22. Again, mode coupling dependence on the period for $LP_{11}$ mode 32, 34 is very different from that of $LP_{01}$ 30. Note also, narrower "peaks" for the case of 60 μm central core 22 fiber, compared to 30 μm central core 22 fiber of FIG. 3A. As such, there exists a technological trade-off for size-scaling of HCC fibers 20 where an increase in central core 22 size requires tighter tolerances in fabrication. Note that this resonance characteristic permits spectral bandwidths of 100-200 nm, which is sufficiently broad for all practical purposes and may be advantageous for certain applications described in detail below.

Figure 4:
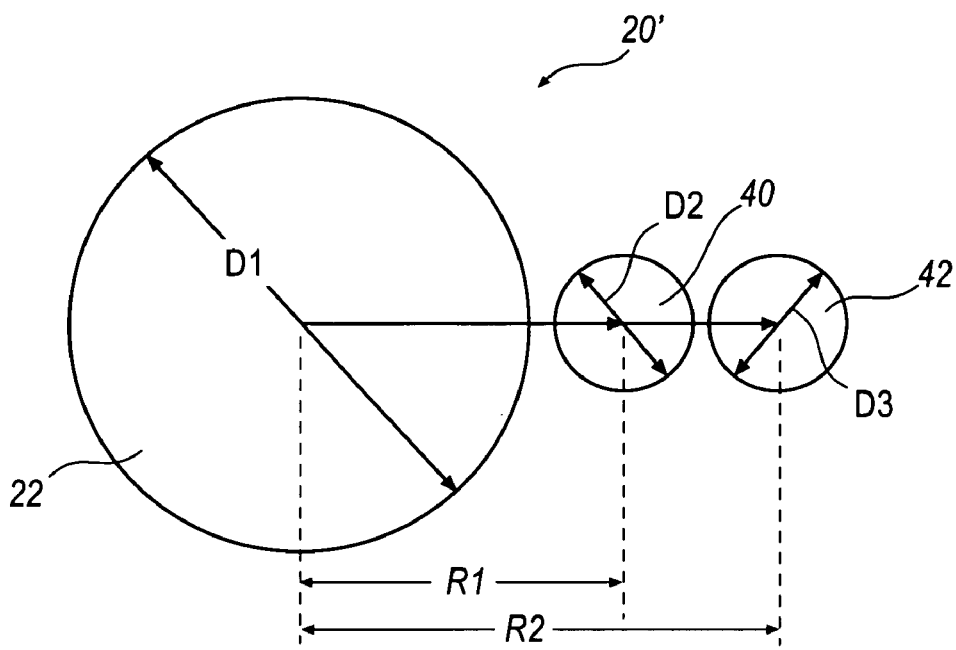
FIG. 4 is a cross-sectional view of an alternative embodiment of a composite waveguide.

An alternative embodiment of HCC fiber 20' is illustrated in FIG. 4 and includes central core 22, a first helix 40, and a second helix 42. First helix 40 is helically wound along, and is in optical proximity to, central core 22 where R1 represents the distance from the central axis of central core 22 to the central axis of first helix 40 and D2 represents the diameter of first helix 40. Second helix 42 is similarly wound along central core 22 but is in optical proximity to first helix 40, where R2 represents the distance from the central axis of central core 22 to the central axis of second helix 42 and D3 represents the diameter of second helix 42.

In comparison to the single-helix structure of FIG. 1, the coupled-mode illustrations of FIGS. 3A and 3B above do not include helix-induced loss and, as such, illustrate details of the modal matching peculiarities in HCC fiber 20'. An accurate prediction of both the effects of quasi-phase-matching and helix-side loss may be obtained using beam propagation numerical simulations. Results for one particular structure are described below with respect to FIG. 5 and Tables I-II. For example, central core 22 is 30 μm in diameter with core-clad refractive index step profile corresponding to numerical aperture of 0.06 and, by itself, is supporting five guided modes. First helix 40 and second helix 42 consist of two 12-μm diameter cores, with 2 μm edge-to-edge separation from each other. Further, first helix 40 is separated from the central core 22 by 2 μm edge-to-edge separation. Details of structure are listed in the Table I below and the structure itself is illustrated in FIG. 4.

TABLE I

| Core diameter, μm | Core NA | Radius from center axis, μm |
|---|---|---|
| D1 = 30 μm (Central core 22) | 0.06 | 0 μm |
| D2 = 12 μm (first helix 40) | 0.075895 ($\sqrt{1.6*0.06}$) | R1 = 23 μm |
| D3 = 12 μm (second helix 42) | 0.075895 ($\sqrt{1.6*0.06}$) | R2 = 37 μm |

Figure 5:
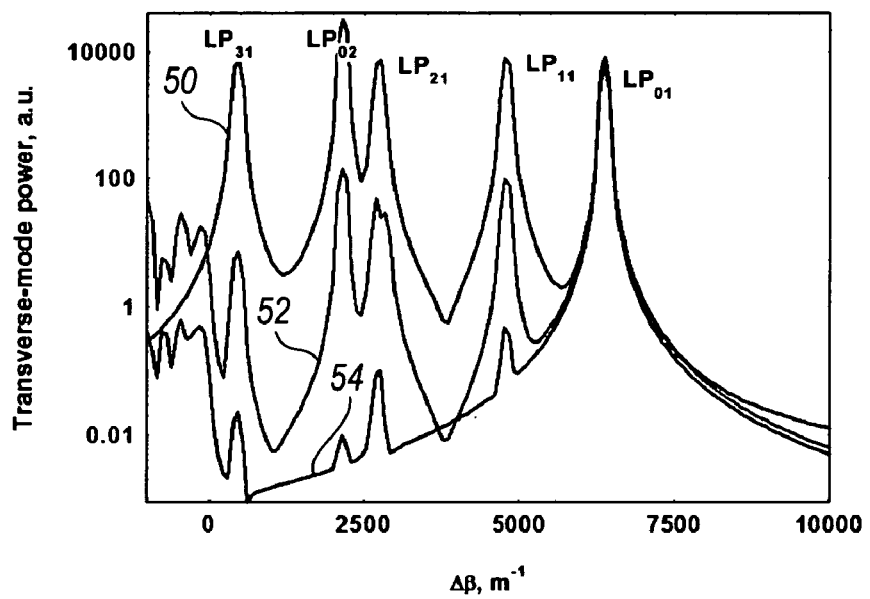
FIG. 5 is a graph of the transverse-mode spectrum at the input and after certain propagation distances of the composite waveguide of FIG. 4.

FIG. 5 illustrates the transverse-mode spectrum at the input of HCC fiber 20' of FIG. 4 and after propagating approximately 16 cm and 65 cm distances in such a fiber, given a helical period of 8.1 mm. The exciting beam at the input is selected so that all five central core 22 modes are excited. Four of the central core 22 modes contain 12.5% of the total input beam power each and one mode ($LP_{02}$) containing 50% of the total input power. Line 50 represents the five-mode input spectrum. Line 52 represents the modal spectrum after 16.384 cm of propagation through HCC fiber 20'. Line 54 represents the modal spectrum after 65.536 cm propagation through HCC fiber 20'. As illustrated, the fundamental mode ($LP_{01}$) is propagating with negligible loss (not observable on the scale on the plots), while all higher-order modes experience orders-of-magnitude decrease in their power. For example, at the 16 cm distance all higher order modes are suppressed by more than 100 times. After the 65 cm distance all higher order modes are suppressed by $10^6$ times. The calculated modal losses for the helical period of 8.1 mm are illustrated in the table II.

TABLE II

| | Modal losses for 8.1 mm helical period | | | | |
|---|---|---|---|---|---|
| | Mode | | | | |
| | $LP_{01}$ | $LP_{11}$ | $LP_{21}$ | $LP_{02}$ | $LP_{31}$ |
| Loss | 1.1 dB/m | 150 dB/m | 160 dB/m | 350 dB/m | 400 dB/m |

Figures 6A, 6B, 6C, 6D:
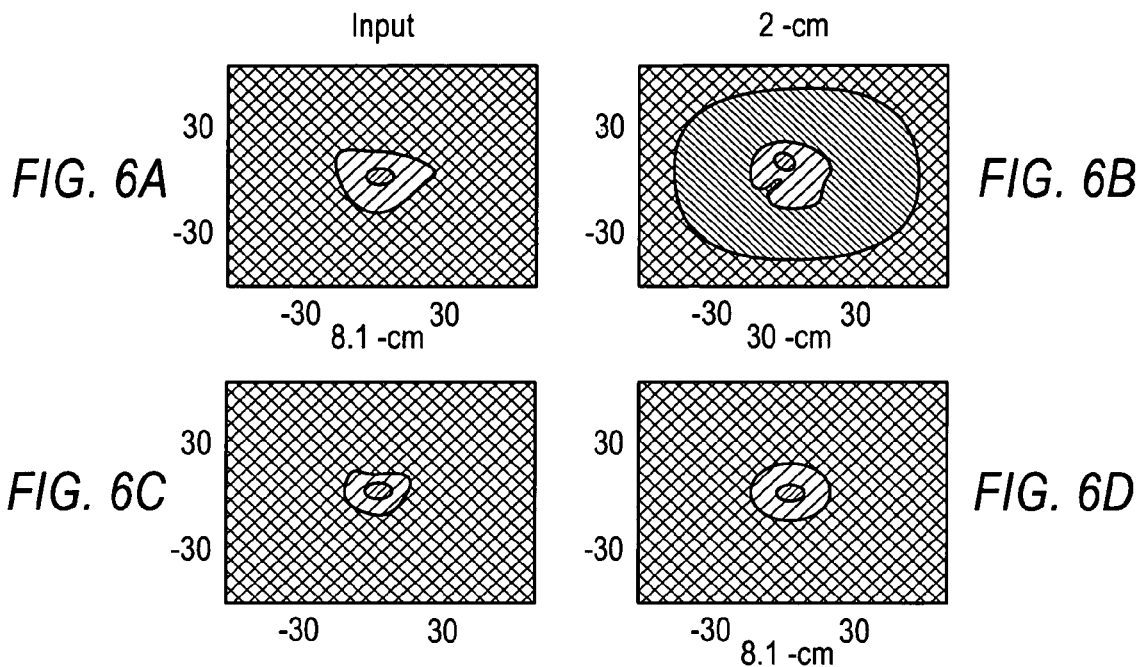
FIGS. 6A-6D are graphs of beam profiles after propagating in the composite waveguide of FIG. 4.

This is further illustrated in FIG. 6, where beam profiles after propagating in HCC fiber 20' structure are shown. After 30 cm of propagation in central core 22, only the fundamental central core 22 mode remains.

Figure 7:
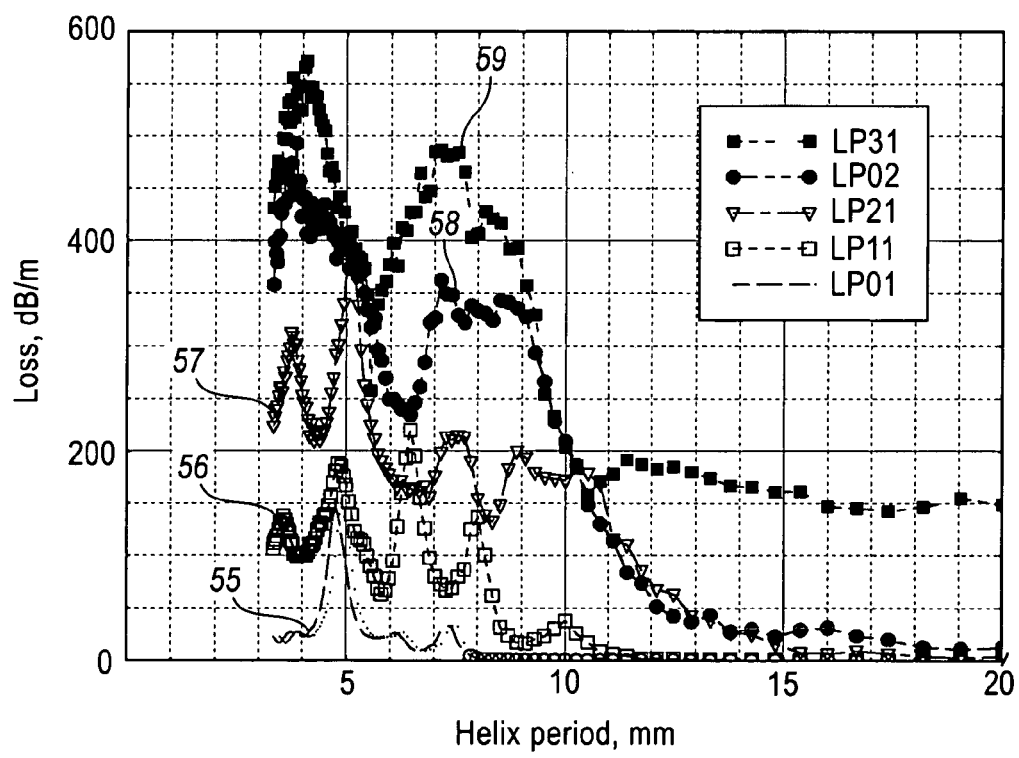
FIG. 7 is a graph showing modal losses for different modes as a function of helical period of the composite waveguide of FIG. 4.

FIG. 7 illustrates modal losses for different modes of HCC fiber 20' as a function of a helical period. $LP_{01}$ mode 55, $LP_{11}$ mode 56, $LP_{21}$ mode 57, $LP_{02}$ mode 58, and $LP_{31}$ mode 59 are illustrated. There is a broad helical-period range (7.5 mm to 10 mm) with negligible fundamental-mode loss and, simultaneously, with high loss for all higher-order modes above $LP_{11}$ mode 56. $LP_{11}$ mode 56 is the closest to the fundamental $LP_{01}$ mode 55 and typically proves to be most difficult to suppress. As we can see from this figure, $LP_{11}$ mode 56 is suppressed at two helix period values of 8.1 mm and 10 mm. Although at 10 mm helix period $LP_{11}$ modal loss of ~50 dB/m is much less than at 8.1 mm, but it is still very large for all practical purposes. Furthermore, at 10 mm period $LP_{01}$ mode 55 losses are <0.3 dB/m. The example illustrated in FIG. 7 shows that HCC fiber 20, 20' structures may be designed with significant design margin, facilitating their practical implementation.

Figure 8:
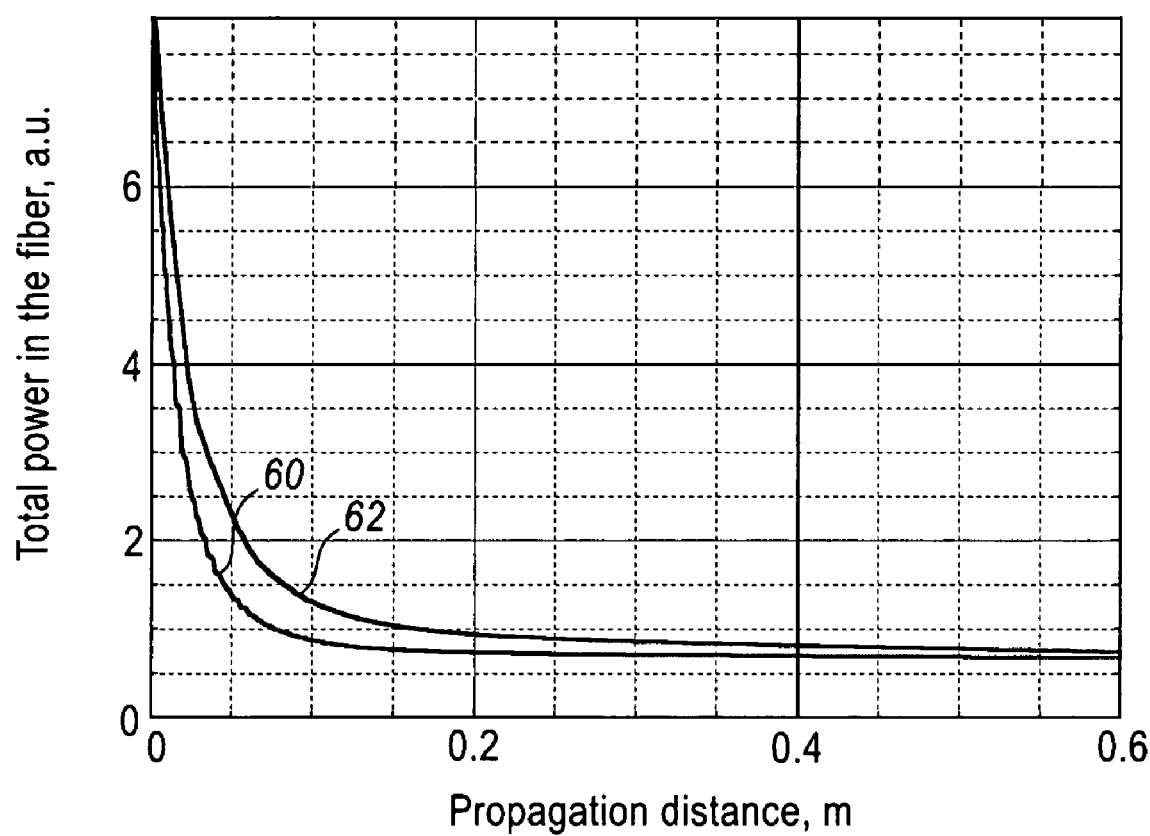
FIG. 8 is a graph comparing power-transients in the composite waveguide of FIG. 4 and an equivalent-size truly single-mode fiber.

It is important to note that such high losses for higher order modes make HCC fiber 20, 20' effectively single-mode, since even inter-modal scattering in an LMA core becomes suppressed to a large degree. FIG. 8 illustrates compared power-transients in HCC fiber 20, 20' and in equivalent-size truly single-mode fiber (very low 0.02 NA and 30 μm core). The power transients in SM fiber occurred within 5 cm and in HCC fiber 20, 20' within 10 cm length of a fiber, indicating that HCC fiber 20, 20' practically behaves similarly to a true single-mode fiber. This means that even short fiber lengths of HCC fiber 20, 20' will be transmitting only a fundamental mode, thus significantly facilitating monolithic all-fiber LMA fiber laser systems where passive-fiber leads typically should not exceed 10 cm to ~30 cm lengths.

Figure 9A:
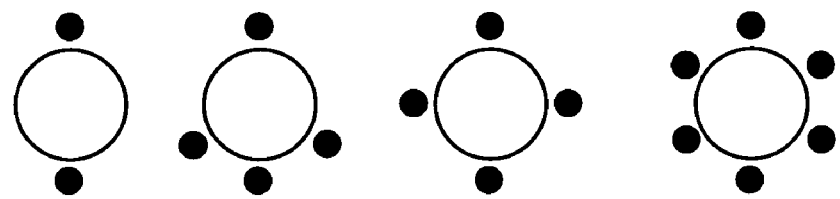
FIGS. 9A-9D illustrate further alternative embodiments of the composite waveguide.
Figure 9A:
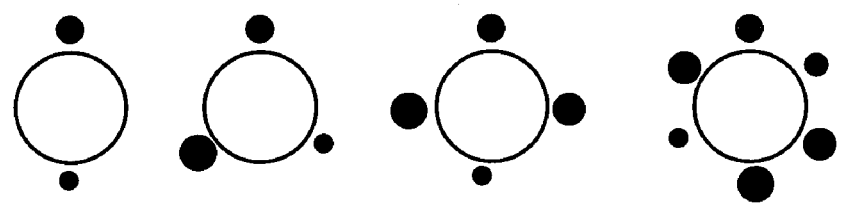
Figure 9B:
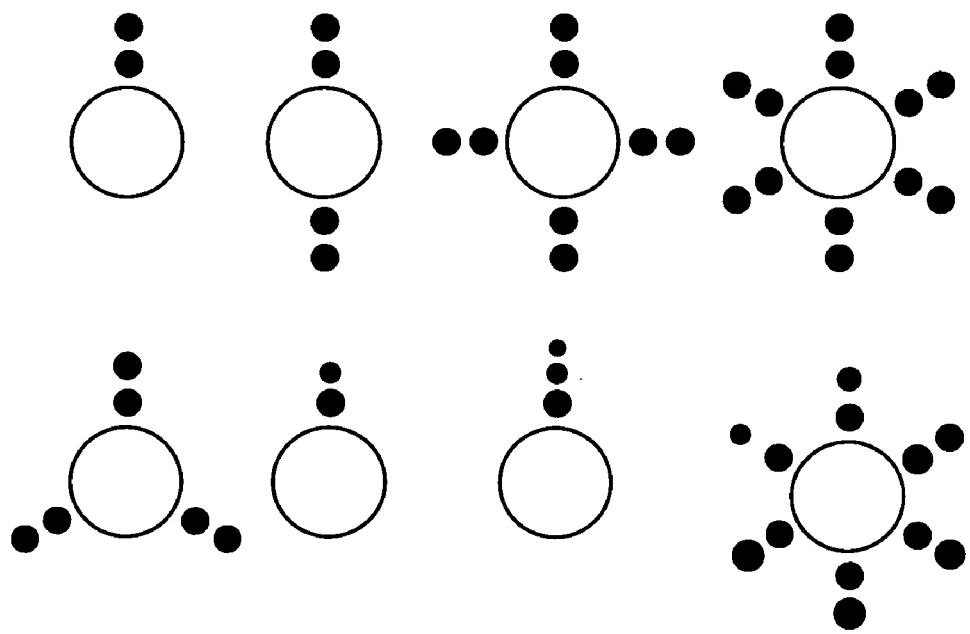
Figure 9C:
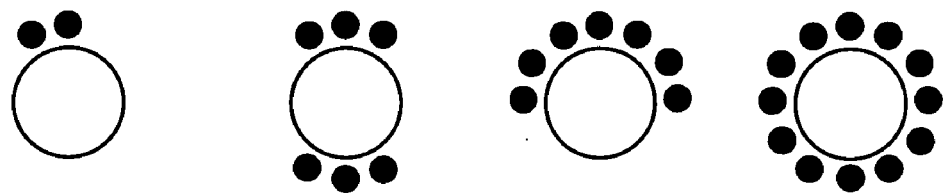
Figure 9C:
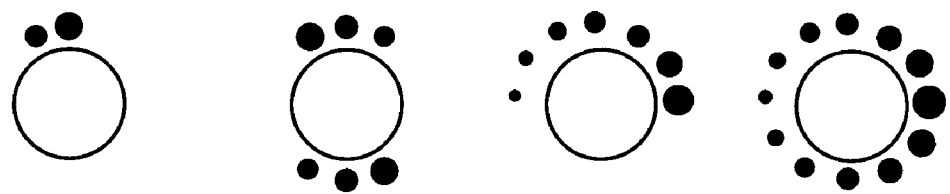
Figure 9D:
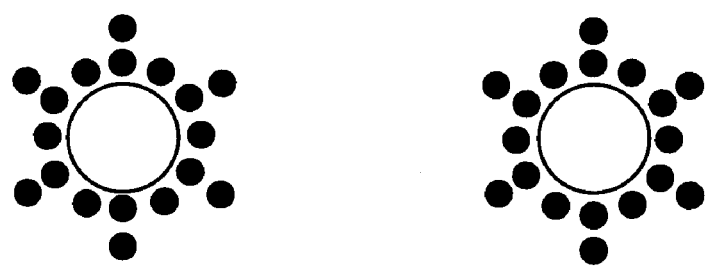
Figure 9D:
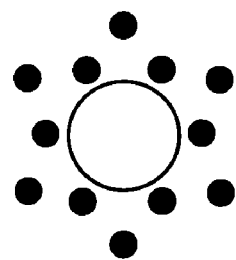

Further alternative embodiments of HCC fiber 20 are illustrated in FIGS. 9A-9D. The alternative embodiments described in FIGS. 9A-9D are grouped into categories determined by the interaction of between neighboring cores. FIG. 9A illustrates structures where optical proximity interactions occur radially and only between central core 22 and side cores 24', but not among side cores 24'. The alternative embodiments differ from one other with respect to the number, relative positions and side core 24' sizes, but none of side cores 24' are close enough to each other to mutually interact. FIG. 9B illustrates structures where optical proximity interactions occur radially between both central core 22 and side cores 24', as well as between adjacent side cores 24' that are arranged in more than one layer along the radial dimension (forming concentric rings). FIG. 9C illustrates structures where interactions between central core 22 and side cores 24' are in the radial direction, while interactions between side cores 24', that are arranged in one row along a concentric ring, are along an azimuth direction. FIG. 9D illustrates examples of structures where interactions between adjacent side cores 24' are along both radial and azimuth directions.

The preceding examples of alternative embodiments shown in FIGS. 9A-9D have been presented only to illustrate and describe exemplary embodiments of the possible configurations of the present invention. These configurations, and the configurations detailed in FIGS. 1A, 1B, and 4, are not intended to be exhaustive or to limit the invention to any precise form disclosed. It will be understood by those skilled in the art that there is a large variety of other choices in terms of relative core positions, their number, their core sizes and shapes, and their refractive indexes and index profiles, thus permitting many further degrees of freedom for optimizing the overall performance with respect to achieving desired select-mode coupling and select-mode loss, and achieving a large variety of other design goals for such fiber structures.

Figure 10A:
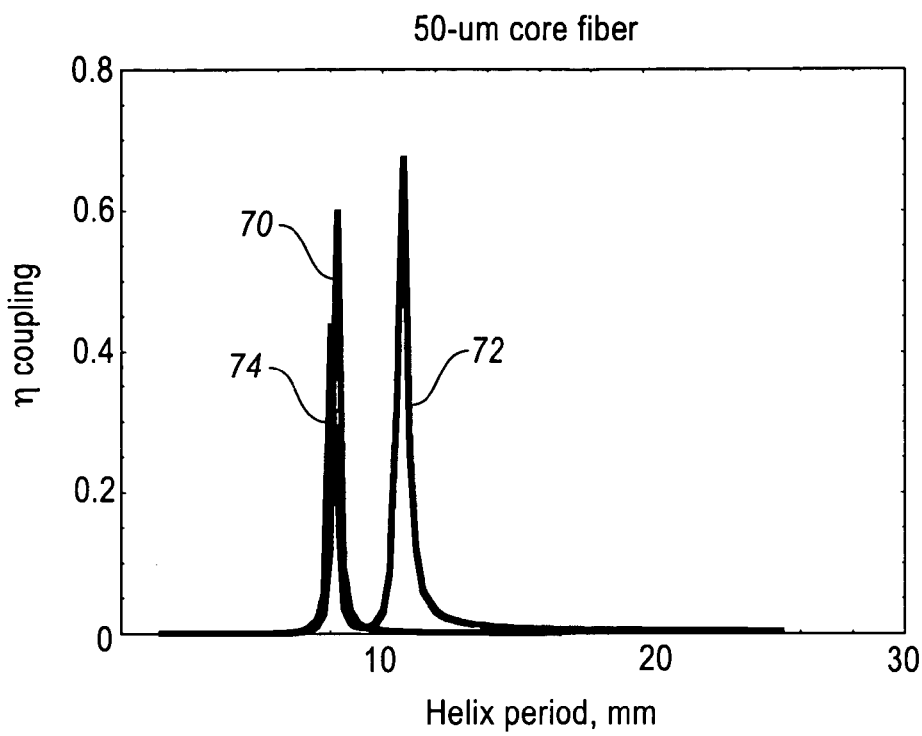
Figure 10B:
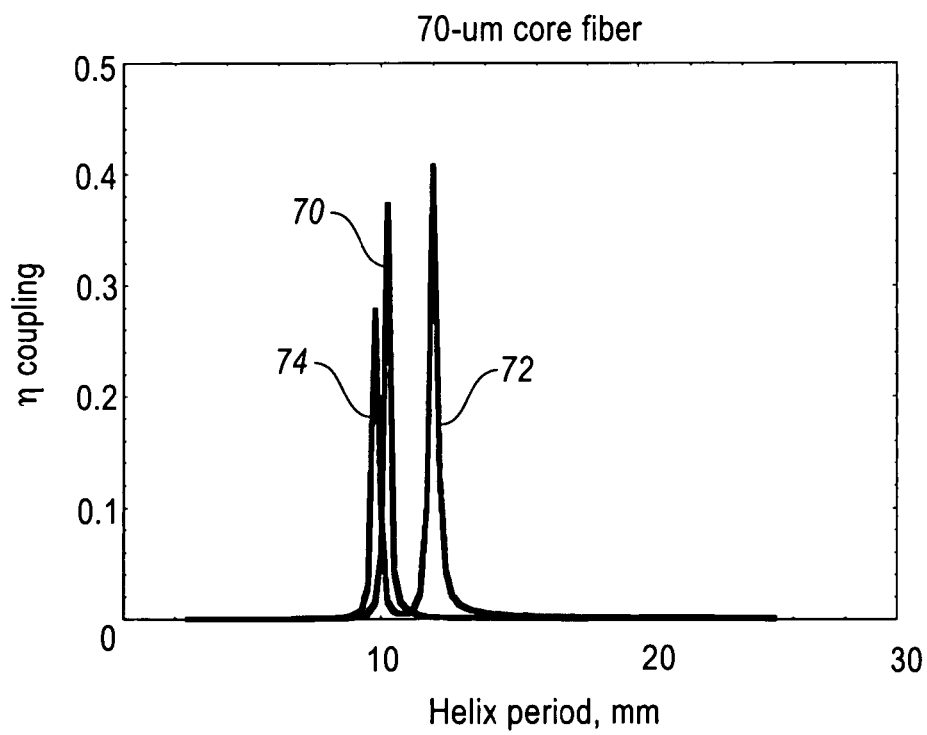

Turning now to FIGS. 10A-10C, which illustrate the scalability of effectively single-mode central core 22 size, coupling is shown between central core 22 sizes of 50 µm, 70 µm and 90 µm 0.06-NA and a single 8 µm 0.07-NA side core 24 with 4 µm edge-to-edge separation from central core 22. FIGS. 10A-10C illustrate mode coupling between side core 24 and $LP_{01}$ (represented by a peak 70 of a coupling curve) and $LP_{11}$ (represented by peaks 72, 74) modes of central core 20. FIGS. 10A-10C show that the coupling resonance relative positions and widths do not change significantly with increasing core size, where only coupling strength is decreasing with increasing central core 22 size. The fact that the peak 70 for $LP_{01}$ and peak 72 for $LP_{11}$ modes remain at different helix-period values is important for maintaining modal loss selectively and thus, central core 22 size scalability. Reduction in the coupling magnitude merely affects the rate at which a particular mode is suppressed. Furthermore, the HCC fibers 20 used for comparison in FIGS. 10A-10C were not optimized for a central core 22 size of greater than 30 µm. Thus, optimization for the helix-side structures, for any given central core 22 size, may provide only small decreases in the coupling strength with the increasing central core 22 size.

In comparing the illustrations in FIGS. 10A-10C, despite the increase of central core 22 size, selective coupling and effective higher-order mode suppression may be maintained. This phenomenon enables very large effectively-single-mode core sizes. The practical limitations on the maximum achievable effectively-single-mode core size may be determined by two main factors: first, inter-modal scattering in the central core 22 and, second, the achievable HCC fiber 20 fabrications tolerances. With an increase of the central core 22 size, inter-modal scattering increases, eventually leading to an increase in the fundamental-mode loss through scattering into higher-order modes and subsequent power loss through side core 24 helix coupling. However, very large values of higher-order mode suppression also effectively reduce the coupling strength between fundamental and higher-order modes.

Although the above examples of HCC fiber 20 structures are based on step-index fiber profiles, other individual-core profiles (such as graded-index, ring-core, M-core, etc.) are also possible. Furthermore, some of the non-step-profile structures are even advantageous for implementing HCC fiber 20 structures.

Turning now to FIGS. 11A-11B, a ring-type fiber core and the associated index profile are shown. The ring-type fiber core may be used with central core 22 or side core 24. However, in one embodiment it is at least preferable to use the ring-type fiber profile for side core 24 because the ring-type profile provides higher modal loss that is desirable for the side core 24 only.

Due to the resonant nature of the HCC fiber 20 concept, optimization is highly desirable to maximize coupling strength of central core 22 to helical side core 24, broaden the resonance width (as a function of core NA and/or helix period) of this coupling, and to maximize helical side core 24 loss. Such an optimization provides a wider range of fabrication tolerances and higher practically-achievable higher-order mode losses. One of the primary benefits of implementing optimization is to increase the mode penetration (modal tail) depth into the cladding. Longer tails of the neighbor-core modes ensure improvement of all three of the optimization parameters providing: (i) stronger modal overlap between different cores leads to both stronger inter-core coupling and wider resonances, where (ii) longer modal tails generally lead to higher radiation loss from the helically-coiled cores.

For example, FIGS. 11A-11B illustrate how using a ring-type fiber core profiles increases modal tail. Modal penetration into cladding can be increased by more than an order of magnitude for certain structure parameters (inner and outer radiuses $R_1$ and $R_2$, and refractive index-differences with respect to cladding $\Delta n_1$ and $\Delta n_2$, respectively). However, the particular structure of FIG. 11A is only one example from many other possible refractive-index profiles that can be used to optimize HCC structure.

Table III illustrates how optimization of the ring-core structure parameters (shown in FIGS. 11A-11B) may significantly increase modal losses in side core 24. Table III shows calculated modal loss $\alpha_{loss}$ at a core-curvature radius $R_c$=5 mm, for different parameter values. Parameter selection is such that ring-core mode effective refractive index $\Delta n_{eff}$ is kept approximately the same, which means that central-core and side-core coupling conditions remain the same for each side core 24, 24', 40, 42 structures. The first row in Table III corresponds to a standard step-index core fiber as a reference. As is illustrated from the loss values in the last column the loss for such ring structure can be increased by many orders of magnitude compared to a step-index profile mode with the same effective-index value.

TABLE III

Optimization of ring-core structure parameters

| $R_1$, µm | $\Delta n_1$ | $\Delta r_2 =$ $R_2 - R_1$, µm | $\Delta n_2$ | $LP_{mn}$ mn | $\Delta n_{eff}$ | $R_c$, mm | Loss $\alpha_{loss}$, dB/m |
|---|---|---|---|---|---|---|---|
| 4 | 0.006759 | 0 | 0 | 01 | 0.004718 | 5 | 0.111 |
| 4 | 0.000000 | 4 | 0.007 | 01 | 0.0048 | 5 | 15.7 |

TABLE III-continued

Optimization of ring-core structure parameters

| $R_1$, μm | $\Delta n_1$ | $\Delta r_2 =$ $R_2 - R_1$, μm | $\Delta n_2$ | $LP_{mn}$ mn | $\Delta n_{eff}$ | $R_c$, mm | Loss $\alpha_{loss}$, dB/m |
|---|---|---|---|---|---|---|---|
| 5 | 0.000000 | 4 | 0.007 | 01 | 0.004777 | 5 | 68.7 |
| 6 | 0.000000 | 4 | 0.0071 | 01 | 0.004848 | 5 | 227.8 |
| 7 | 0.000000 | 4 | 0.00715 | 01 | 0.004881 | 5 | 769 |
| 10 | 0.000000 | 4 | 0.0072 | 01 | 0.004909 | 5 | 4.9e04 |
| 12 | 0.000000 | 4 | 0.0072 | 01 | 0.0049045 | 5 | 7.8e05 |

The helical side core 24 may function to provide high loss for the modes coupled from the central LMA core 22 due to mode radiation from a curved fiber core. Generally, core curvature increases with a decrease in the helix period and with the increase in the distance between the side core 24 and the axis of the HCC fiber 20 (off-axis distance). When designing HCC fibers 20, helix period and side core 24 parameters may provide so that both efficient higher-order mode coupling from central core 22 and side core 24 loss can be ensured simultaneously. It is advantageous to extend the helix-period range for which high helix-side losses occur. One method could be to introduce a structural defect to the outer side of the side-helix, thus facilitating additional modal loss from this core. For example, this can be achieved in micro-structured fibers. Such micro-structures are generally fabricated using capillary stacking techniques. Alternatively, side core 24 may be treated with dopants, providing high loss at the desired signal wavelength.

Turning now to fiber birefringence, HCC fiber 20 is compatible with existing highly-birefringent fiber designs. FIG. 12 illustrates a stress filament applying stress to a core in an azimuthally varying direction along the fiber length. The stressed HCC fiber 96 includes a central core 90, a side core 92 and a stress filament 94. Stress filament 94 applies stress on central core 90 in an azimuthally varying direction along length of screw HCC fiber 96, thereby producing circular birefringence in the fiber. This geometry may be referred to as a "screw" fiber and is completely compatible with the HCC fiber 20 concept. Furthermore, it is possible to combine HCC fiber 20 and screw fiber techniques leading to single-polarization LMA fibers.

Using screw fiber techniques, the right- or left-circular modes are the eigenmodes of a screw HCC fiber 96. Thus, the launched circular state of polarization is invariant along the transmission direction. Additionally, if the fiber is excited by a circular light (either right or left) the light propagating along the fiber will be this, and only this, circular polarization along the entire length of the fiber. In practical use, the splicing of segments of screw HCC fiber 96 uses conventional methods. The helical stress filaments in the successive segments need not to be continuous at a joint, because an off-set of these filaments will result in a phase shift of the traveling light at a joint, but will not change its circular state of polarization. Furthermore, screw HCC fiber 96 tolerates bending of comparatively small radius of curvature without disturbing the circular polarization of the transmitted eigenmode.

In sum, the HCC fiber 20 concept may be utilized to design screw HCC fiber 96 composite waveguides to implement high-circular-birefringence fibers. Furthermore, high-circular-birefringence provides that the fundamental $LP_{01}$ mode in the central LMA core 22 of HCC fiber 20 is split into two orthogonal-polarization (Right-hand circularly polarized (RCP) and Left-hand circularly polarized (LCP)) modes, each characterized by a different phase velocity. By selecting a suitable helical side core 24 period, it is possible to achieve phase-matching and, consequently, power coupling from one of these two polarization modes into side core 24. Thus, high loss is induced for the fundamental-mode polarization. Consequently, a large-mode HCC fiber 20 may be constructed that supports only a single polarization in a single spatial mode (single-polarization fiber). Such a fiber is highly desirable for a number of important applications (coherent or spectral beam combining, for example). Current single-polarization fibers, however, are only available with very small core sizes (much smaller mode sizes compared to typical LMA fiber mode sizes).

Alternatively, it is possible to design a single-polarization HCC fiber without using a high-birefringence method (i.e., without using above described screw fiber). Due to the geometry of a helical optical path, a helically-coiled core possesses circular birefringence, i.e., LCP and RCP polarizations of the same spatial helix-core mode constitute two normal modes of propagation (which propagate without change in their polarization state) with different phase velocities. Furthermore, since only the fields of identical polarizations interact, the LCP-polarized side-helix mode only interacts with the LCP-polarized central core 22 mode, and, likewise, only RCP modes of the central core 22 and helical side cores 24, 24' mutually interact. Consequently, helix-periods for phase-matching RCP and LCP interactions between center and helix-side modes are different, permitting selection of such HCC fiber designs which, in addition to higher-order mode suppression, allow suppressing one of the circularly-polarized fundamental central-core modes as well.

Yet another application of HCC fiber 20 includes wavelength conversion using four-wave mixing (FWM) nonlinear interactions. Existing fiber lasers use rare-earth dopants in a glass matrix to provide optical gain at the wavelengths determined by the spectroscopic properties of the dopants. However, a very limited spectral range can be covered with existing rare-earth doped fiber lasers and amplifiers. Therefore, it is highly desirable to extend the laser operation to any desirable optical wavelength.

In principle this can be achieved by using nonlinear wavelength conversion through nonlinear interactions in an optical fiber, such as four-wave-mixing (parametric amplification). A practical limitation is that efficient wavelength conversion can only be achieved through phase-matching of interacting waves. In terms of propagation constants of fiber modes this phase-matching condition can be expressed as $\beta_{signal} + \beta_{idler} = 2\beta_{pump}$. Here, optical frequencies of signal, idler and pump waves should obey the energy conservation relation: $\omega_{signal} + \omega_{idler} = 2\omega_{pump}$. Due to the phase-matching requirement, efficient FWM parametric wavelength conversion in single-mode fibers has only been achieved so far in spectrally limited ranges using FWM interaction in the vicinity of zero-dispersion wavelength, using fiber birefringence, or exploiting accidental fulfillment of the phase-matching condition.

However, HCC fiber 20 power exchange between central-core mode and helix-side can occur due to quasi-phase matching, i.e. when phase velocities of modes exchanging power are not equal. For example, one can consider interaction between $LP_{01}$ mode in central core 22 and $LP_{11}$ mode in helical side core 24. Due to this inter-core power exchange, the phase-velocity of the $LP_{01}$ mode should increase compared to the phase velocity in the uncoupled core. Because the optical field circulates between "slow" central-core $LP_{01}$ and "fast" helix-side $LP_{11}$ modes, the effective phase velocity should acquire value somewhere between these "slow" and "fast" phase velocities. The exact value of the resulting phase velocity may be determined by the degree of coupling between cores 22, 24. This allows controlling $LP_{01}$ mode phase velocity by controlling HCC fiber 20 structure parameters that determine the degree of coupling between the modes. Wavelength range where this phase-velocity control occurs is selected by choosing an appropriate side-helix period.

Phase-velocity matching may be achieved for any set of signal, idler and pump wavelengths within transparency range of an optical fiber. The only constraint is the energy conservation law. As a result, this technique enables all-fiber based wavelength conversion devices. There are a variety of possible implementations of wavelength-conversion schemes using such HCC fibers 20. One approach is to use a passive HCC fiber 20, which would be pumped with an external laser operating at $\omega_{pump}$. Alternatively, one may integrate HCC fiber 20 structures for wavelength conversion with an active rare-earth doped central core 20. In this case, doped central core 22 would provide optical gain at $\omega_{pump}$, which could be determined by the spectrally-selective components (such as fiber Bragg grating) inside the laser cavity. HCC fiber 20 design for phase-matched FWM then provides parametric gain at the required wavelengths corresponding to $\omega_{signal}$ and $\omega_{idler}$. Such a laser would produce a multi-wavelength output (at wavelengths corresponding to $\omega_{signal}$, $\omega_{idler}$ and $\omega_{pump}$). Additionally, the laser may be optimized to produce most of the output power at $\omega_{signal}$. Thus, the laser operates at a wavelength outside the gain band of rare-earth ions. Although wavelength-conversion advantageously utilizes small single-mode central cores 22 to maximize nonlinear interaction, for very high powers (in the range between 1-10 kW, for example) larger central cores could be chosen. Furthermore, controlling the modal phase-velocity in HCC fiber 20 structures also allows control of modal dispersion (wavelength-dependence of a phase velocity). This capability is important for HCC fiber use in ultrashort-pulse fiber laser systems.

Now turning to stimulated Raman scattering (SRS), the limitation in achievable peak and average powers in optical fiber amplifiers and lasers will be discussed. SRS is a nonlinear optical phenomenon having a well defined intensity threshold. Above this threshold optical signal in the fiber starts amplifying long-wavelength optical signal. This Raman gain can become so large (>50 dB) that it can produce a strong signal starting from only a few spontaneous photons that always exist in the Raman-gain spectral band. As a result, a very strong optical signal shifted from the pump by >10 THz towards long-wavelength side is generated. In many practical cases this is highly undesirable for a fiber laser or amplifier and, therefore, limits achievable peak or average signal power in a fiber to below SRS threshold.

This SRS threshold can be suppressed in HCC fibers 20 by exploiting its narrow-band nature. Modal coupling between central core 20 and helical side core 24 modes occurs only over a limited wavelength range and is centered at a phase-matching or quasi-phase matching condition. The spectral width (and spectral-peak position) strongly depends on the implementation of the helical side core 24 and central core 22 designs. Therefore, HCC fiber 20 structures may be configured such that it would support optical single-mode signal propagation in central core 22 only at the signal wavelength, and would prohibit propagation of all modes at the wavelengths corresponding to Raman-gain band with respect to this signal. Since modal losses in the Raman band can be made very large (>>100 dB/m), SRS threshold can be significantly increased, thus providing an additional avenue for peak and average-power scaling.

We turn now to rare-earth ion gain band engineering for HCC fibers 20. The spectrally-resonant nature of HCC fibers 20 can be further exploited to modify gain bandwidth of a rare-earth doped fiber. For example, an HCC fiber 20 structure may be configured to completely suppress optical gain in the "conventional" 1030 nm to >1100 nm spectral range of Yb-doped fibers. Thus, optical gain may be achieved at 980 nm. Such gain at this wavelength has currently been demonstrated only using small-core single-mode fibers. The importance of large-core HCC fibers 20 operating at 980 nm is that it would allow very efficient (>80%) brightness conversion from 914 nm and 940 nm multimode laser diodes operating with transversely multimode output into diffraction-limited 980 nm wavelength. Achieving this in a large-core fiber provides very high average powers (potentially >1 kW) in a single-transverse mode at 980 nm. This enables high-power fiber laser designs, which can be an in-core pumped system instead of cladding-pumping systems.

Also, this spectrally-depending coupling in the HCC fiber 20 structure may be exploited to re-shape the Yb-doped fiber gain profile itself. Yb-fiber typically has a strong gain peak at approximately 1030 nm that rapidly rolls off towards long wavelengths. Although the optical gain of Yb-doped fiber extends significantly beyond 1100 nm, this broad bandwidth cannot be directly used for broad-band (>100 nm FWHM) optical signal amplification because the significant gain slope inevitably narrows the amplified spectrum to around 1030 nm. Use of HCC fiber 20 structures with high loss for all modes at 1030 nm would offset the gain slope and would effectively produce very broad amplification band in Yb-doped fibers.

In industry, HCC fibers 20, 20' facilitate high-power fiber power scaling by reducing susceptibility to nonlinear effects and by improving high-power pumping conditions. Uniquely large mode areas offered by HCC fibers 20, 20' are particularly advantageous to applications requiring high energy pulse generation. It is a significant advantage of HCC fibers 20, 20' that they eliminate difficulties associated with splicing currently-existing LMA fibers. Because no coiling is required, even short leads of HCC fibers 20, 20', spliced to a fiber system (such as monolithic pump combiner or fiber-coupled optical isolator) permit effective higher-mode suppression. Consequently, inaccuracy in mode-matching between different fibers only results in additional splice loss, not mode-quality degradation as is currently the case with existing LMA fibers. Also, an important advantage of HCC fibers 20, 20' is that the configuration does not require low-NA of the fiber core. This permits LMA designs for Er and Tm doped fibers, operating at technologically important eye-safe wavelength of approximately 1550 nm and 1800 nm to 2000 nm, where achieving low-NA is a significant technical obstacle. Further, HCC fibers 20, 20' are generally applicable to conventional index-guiding fibers as well as to micro-structured and photonic-crystal fibers.

Now turning to the manufacture of HCC fibers 20, 20', the compound fiber structure consisting of central core 22 and helically-wound side core 24 or cores 24', 40, 42 (described above), may be manufactured using existing fiber drawing techniques. An embodiment of the manufacturing technique for fabricating HCC fiber 20 begins by making a fiber preform 100 having a central rotation axis 102 and containing a central core 122 and a helically-wound side core 124 placed off-center relative to central rotation axis 102 (illustrated in FIG. 13A). In one embodiment, a typical preform 100 having a singe central core 122 may be drilled for insertion of side core 124. Side core 124 may be selected from pre-manufactured glass rods having a predetermined dopant composition and then inserted into the drilled holes of preform 100. In the case of a multiple side core 24, 24', 40, 42 embodiments for HCC fibers 20, 20', preform 100 may be drilled multiple times and multiple side cores 124 may be inserted. The final preform 100 structure is then heated to collapse any air gaps.

Alternatively, general photonic-crystal fiber fabrication procedures may be utilized. In this case, multiple glass capillaries are stacked together. The overall structure may be selected by choosing missing capillaries in certain locations or, alternatively, by inserting doped capillaries. The stacked structure is then heated and collapsed to provide a solid structure.

HCC fibers 20, 20' may then be manufactured by drawing or pulling fiber from preform 100 while preform 100 is rotating (illustrated in FIG. 13B). Thus, a straight central core 22 and a helically wound side core 24 (illustrated in FIG. 13C) or cores 24', 40, 42 are created. The rotation may be accomplished by rotating a fiber-draw oven in which fiber preform 100 is mounted at a constant rate. The required helix period then may be achieved by selecting the proper combination of the fiber drawing speed and the oven rotation rate. This approach would produce helical cores (such as HCC fiber 20) with a constant helix period and with a fixed handedness of the helix.

Alternatively, the oven rotation speed can be varied during the draw, thus producing variable helical periods. Also, the rotation may change direction as well as rate, thus producing both variable helix period and alternating helix handedness along the fiber. Such methods are useful for producing more complicated compound waveguide structures.

The preceding description has been presented only to illustrate and describe exemplary embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from its essential scope. Therefore, it is intended that the invention not be limited to any particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A composite waveguide, comprising:
   a central waveguide;
   at least one side waveguide helically wound about said central waveguide;
   a first edge of said at least one side waveguide being in optical communication with said central waveguide; and
   an exterior portion of said at least one side waveguide being substantially near the outer radius of the composite waveguide, said exterior portion including at least one structural defect, whereby said at least one structural defect facilitates modal loss from the composite waveguide.

2. The composite waveguide of claim 1, wherein said composite waveguide is an index-guiding fiber.

3. The composite waveguide of claim 1, wherein said composite waveguide is a photonic crystal fiber.

4. The composite waveguide of claim 3, wherein said at least one structural defect is configured using capillary stacking.

5. The composite waveguide of claim 1, wherein said at least one structural defect is configured using dopants.

6. The composite waveguide of claim 1, wherein said at least one structural defect is configured by said at least one side waveguide being doped with dopants.

7. The composite waveguide of claim 1, wherein the composite waveguide is configured for splicing with another waveguide or another composite waveguide.

8. The composite waveguide of claim 1, wherein the composite waveguide is configured for operation at about 975 nm.

9. The composite waveguide of claim 1, wherein the composite waveguide is configured for suppressing stimulated Raman scattering.

10. The composite waveguide of claim 1, wherein the composite waveguide is configured for gain reshaping.

11. The composite waveguide of claim 1, wherein said central waveguide and said at least one side waveguide are configured for phase-matching for creating parametric wavelength conversion.

* * * * *